J. R. HADLINGTON.
CHICKEN BROODER.
APPLICATION FILED JUNE 2, 1915.
1,176,545.
Patented Mar. 21, 1916.
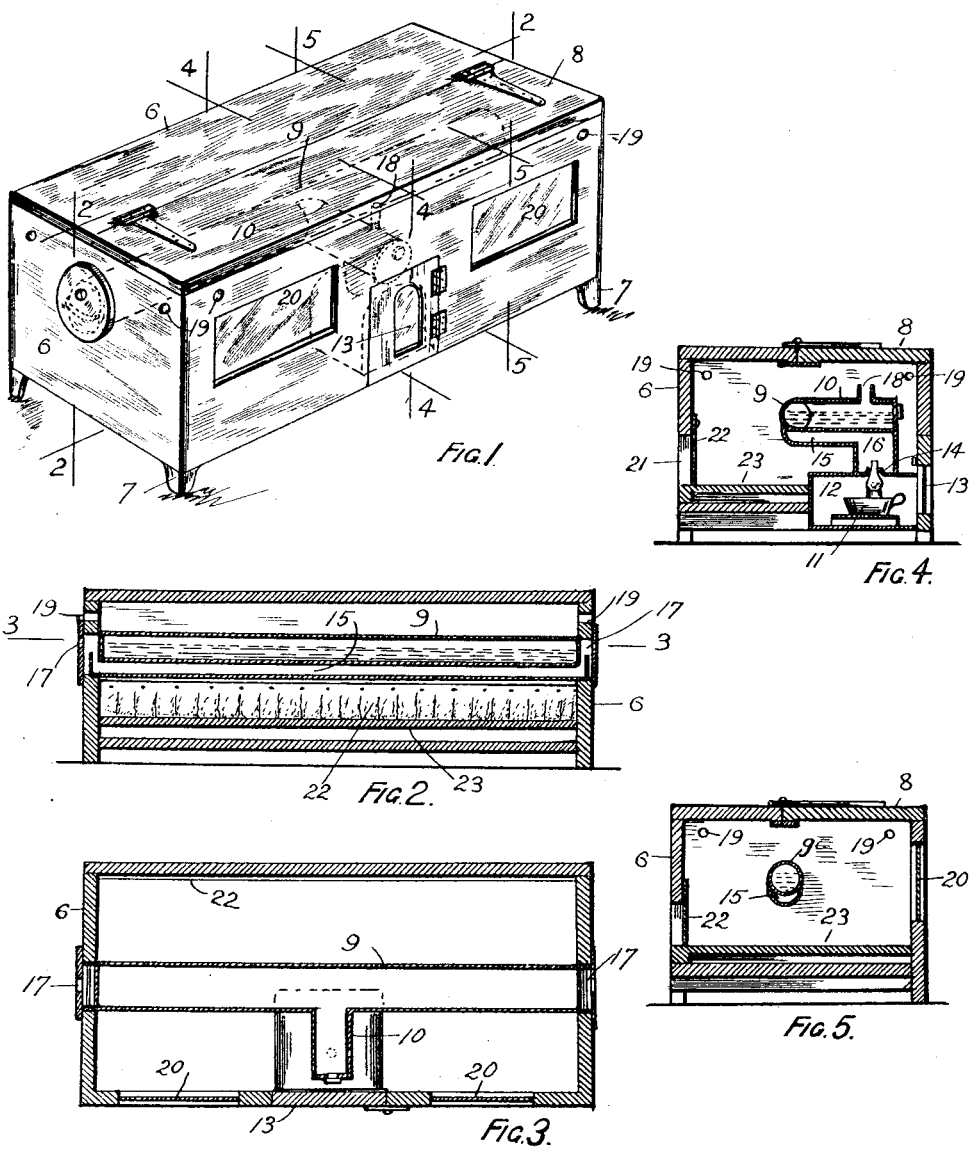
Witnesses:
M. E. McDade
[signature]
Inventor
James R. Hadlington
by
[signature]
Attorney

UNITED STATES PATENT OFFICE.

JAMES RICHARD HADLINGTON, OF SEVEN HILLS, NEW SOUTH WALES, AUSTRALIA.

CHICKEN-BROODER.

1,176,545.   Specification of Letters Patent.   Patented Mar. 21, 1916.

Application filed June 2, 1915. Serial No. 31,740.

*To all whom it may concern:*

Be it known that I, JAMES RICHARD HADLINGTON, a subject of the King of Great Britain, residing at Seven Hills, in the State of New South Wales, Commonwealth of Australia, have invented certain new and useful Improvements in Chicken-Brooders, of which the following is a specification.

This invention relates to improvements in chicken brooders and has been devised with the main object of providing a brooder which will be comparatively inexpensive to manufacture and which will permit of perfect ventilation with a minimum loss of heat. The construction enables the brooder to be placed near the ground and obviates the use of a hover. It also has the further advantage that it contains no passages into which the chickens are apt to crowd.

The invention consists in the construction and arrangement of the several parts which will be more fully hereinafter described and claimed.

I will now refer to the accompanying sheet of drawings in order that my invention may be clearly comprehended.

Figure 1 is a perspective view of a chicken brooder embodying my improvements. Fig. 2 is a section on the plane 2—2, Fig. 1. Fig. 3 is a sectional plan on the line 3—3, Fig. 2. Fig. 4 is a section on the line 4—4, Fig. 1, and. Fig. 5 a section on the line 5—5, Fig. 1.

The same numerals indicate the same parts.

6 represents the casing of the brooder preferably supported on feet 7.

8 is a hinged cover or flap.

9 is a water pipe provided with a branch 10 which extends over the lamp 11 provided with a suitable chimney within a lamp chamber 12 which is preferably lined with sheet metal. This chamber has a door 13 to prevent excessive drafts and is preferably provided with a lock to prevent unauthorized interference.

14 is a hot air and gas conveying means from the lamp.

Immediately below the water pipe is a main hot air passage 15 along which the heated gases and air from the lamp pass after impinging on the end of the branch 10 in the passage 16 and escape to the atmosphere through the outlets 17 on each side. The hot air and gas conveying means 14 opens into the chamber 16.

18 represents the inlet to the water pipe and is preferably provided with a suitable stopper.

19 represent ventilation holes and 20 transparent windows for the purpose of drawing the chickens toward the heater and of viewing their condition.

21 is the entrance to the brooder over which is supported a woolen or other suitable curtain 22 partially divided at intervals to permit the easy egress and ingress of the chickens.

23 represents the false bottom which may be made adjustable as to height or removable.

From the foregoing it will be seen that the water heating pipe runs through the chamber near the top of the latter and has at the center a branch pipe extending to a position just over the heating lamp. The heated gases from the lamp after impinging on the extremity of the branch pipe are conducted along the hot air passage or sleeve 15 immediately below the said branch pipe and escape to the atmosphere through opposite ends of the brooder, the outlets 17 extending vertically with relation to opposite terminals of the hot air passage 15 which is horizontally disposed and the outlets through the opposite ends of the brooder are adjacent to the upper extremities of the outlets or outlet branches 17 to insure a full engagement with the water pipe 9 of the gases and products of combustion from the heating lamp 11. As shown by Fig. 4, it will be noted that the passage 16 just over the heating lamp has considerable area relatively to the passage 15 which is materially reduced in vertical extent so as to bring the heated gases, air currents and products of combustion into close engagement or impingement with the lower portion of the water pipe 9, as also clearly illustrated by Fig. 5.

Having thus described my invention what I claim as new and desire to protect by Letters Patent is:—

In chicken brooders, a casing having the usual brooding chamber and a heating chamber in the lower central portion thereof adjacent to one side and provided with a vertical passage, a heating device within the chamber. a water pipe extending longitudinally of the chamber from end to end in horizontal position, a passage of reduced vertical extent along the lower portion of the water pipe and opening into said vertical passage, the said passage of reduced vertical extent having vertical end branches communicating with outlets through the ends of the casing and whereby the lower portion and opposite ends of the water pipe are fully engaged by the heated gases and products of combustion from the heating device within the heating chamber, the water pipe being located within the brooding chamber of the brooder.

In testimony whereof I have hereunto set my hand in presence of two subscribing witnesses.

JAMES RICHARD HADLINGTON.

Witnesses:
CHARLES E. GRAHAM,
HENRY W. CLARKE.

Copies of this patent may be obtained for five cents each, by addressing the "Commissioner of Patents, Washington, D. C."